Nov. 25, 1924.                                                                    1,516,842
A. C. BUTTFIELD
MACHINE FOR MAKING ARTICLES OF PLASTIC COMPOUNDS OF DIFFERENT COLORS
Filed May 3, 1922
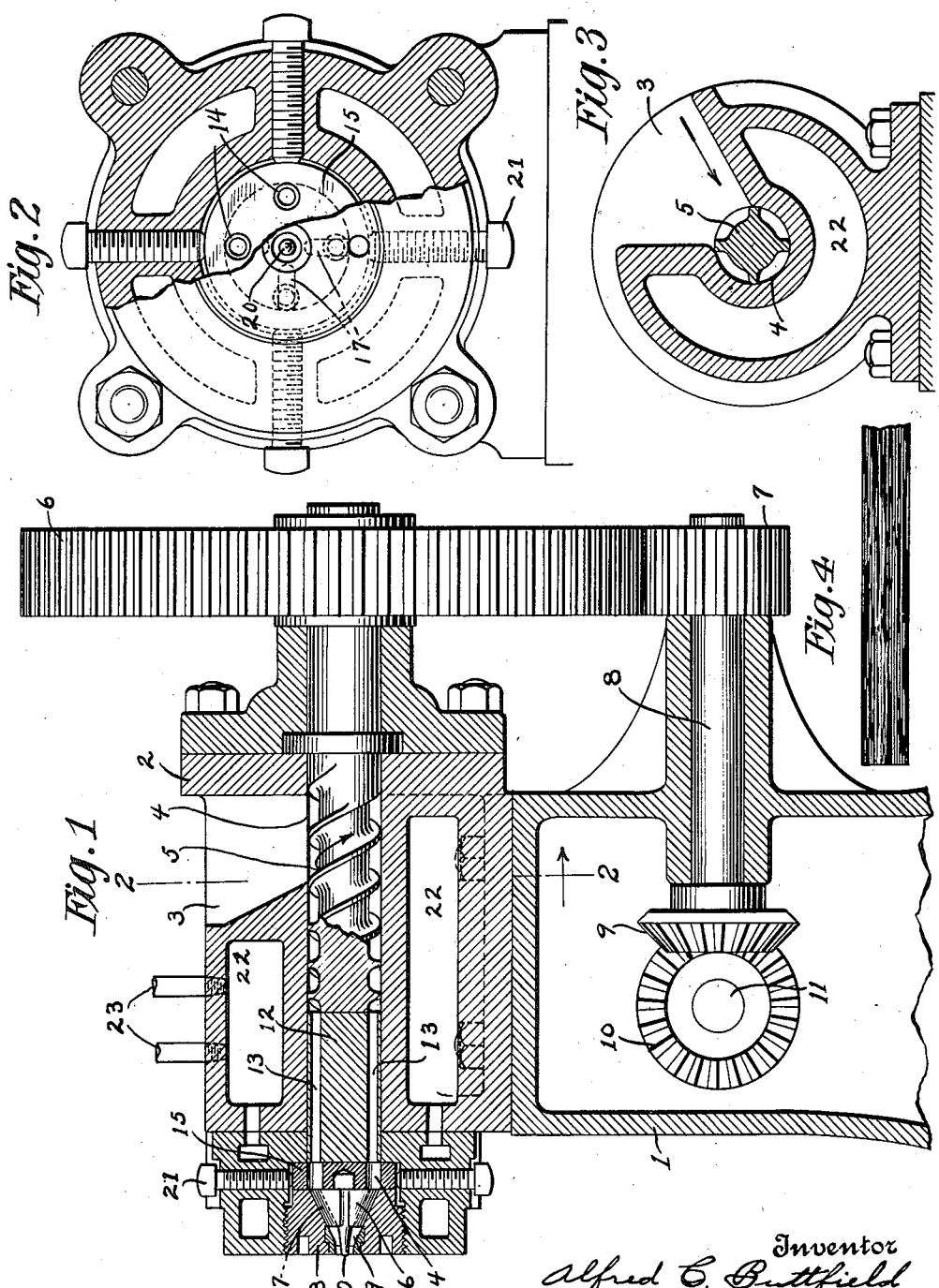

Patented Nov. 25, 1924.

1,516,842

UNITED STATES PATENT OFFICE.

ALFRED C. BUTTFIELD, OF BUTLER, NEW JERSEY, ASSIGNOR TO AMERICAN HARD RUBBER CO., OF NEW YORK, N. Y., A CORPORATION OF NEW YORK.

MACHINE FOR MAKING ARTICLES OF PLASTIC COMPOUNDS OF DIFFERENT COLORS.

Application filed May 3, 1922. Serial No. 558,292.

*To all whom it may concern:*

Be it known that I, ALFRED C. BUTTFIELD, residing at Butler, in the county of Morris and State of New Jersey, have invented new and useful Improvements in Machines for Making Articles of Plastic Compounds of Different Colors, of which the following is a full, clear, and exact description, such as will enable others skilled in the art to which it appertains to make or use the same.

This invention relates to a machine similar to that shown in my copending application, Serial Number 558,293, for making rods, tubes, or the like, of plastic compounds of two or more colors, and the objects of the invention are to improve the appearance of said rods or tubes by giving them the grained appearance of wood.

To the accomplishment of the above objects and to such others as may hereinafter appear, the invention comprises a machine for incompletely mixing or streaking a plurality of plastic compounds of contrasting colors each with the other, separating the same by forcing the incomplete or streaked mixture through a plurality of passageways, and subsequently joining the various mixtures just previous to the time the same is forced through a common orifice, which thereby acts to give to the finished article a very pleasing appearance resembling the grained appearance of wood.

While the invention is to be described with particular reference to the use of plastic hard rubber compounds of different colors, and to a machine for forming said compounds, the same is not to be considered as limited thereto, as the machine is adapted for use with other plastic compounds.

In the drawings:—

Figure 1 is a longitudinal sectional view of a machine made in accordance with the invention.

Figure 2 is an end view of the head block, partly in section.

Figure 3 is a transverse sectional view on the line 2—2 of Fig. 1.

Figure 4 is a view of the finished article showing the grained appearance.

Referring to the drawings, 1 designates the frame of the machine upon which is mounted a head block 2, provided with a feed opening 3 which communicates with a centrally located screw chamber 4 in which is rotatably mounted a feed screw 5.

The body portion of the feed screw 5 extends at one end beyond the side of the head block 2 and has keyed thereto a large gear 6 for turning the same. In the present instance the large gear 6 is arranged to mesh with a pinion 7 keyed to one end of a short shaft 8 mounted in the frame 1. The other end of the short shaft 8 has keyed thereto a bevel pinion 9 which meshes with a bevel pinion 10 secured to a driving shaft 11 also mounted in the frame through the medium of which the feed screw 5 is operated.

In the present instance and in accordance with the present invention the feed screw 5 is made comparatively short which permits of a separating block 12 provided with a plurality of spaced longitudinal passageways 13, in the present instance four in number, being inserted in the forward end of the screw chamber 4.

The passageways 13 of the separating block 12 communicate each respectively with suitable openings 14 in a guide block 15. The central portion of the guide block 15 is adapted to removably hold a feed block 16 which is provided with a plurality of passageways 17 which communicate each respectively with the passageways 13 of the separating block 12. The passageways 17 of the feed block 16 are arranged to communicate with a discharge block 18 having a contracted orifice 19.

In the present instance the feed block 16 is provided with a removable extension 20 which extends beyond the end of the passageways 17 into the center of the orifice 19 so that the material as it is forced out will form a tube. It is obvious that when the extension 20 is removed the material as it is forced out through the orifice 19 will form a rod.

The guide block 15 to which the feed block 16 is secured, is adjustably mounted, in the present instance, in the head block 2 by means of suitable set screws 21 which permits of the same being adjusted to regulate within small limits the feed block 16.

The head block 2 is preferably jacketed, as shown at 22, to permit of steam or the like being admitted through the medium of the pipes 23 to regulate the temperature of the screw chamber 4 which acts to facilitate the plastic compounds being fed by the feed screw 5 through the adjacent passageways.

In accordance with the present invention black hard rubber compound and red hard rubber compound, or any two or more hard rubber compounds preferably of contrasting colors, may, for example, and preferably without mixing, be fed into the feed opening 3. The comparatively short feed screw 5 acts to force the plastic compounds of contrasting colors together with little or no mixing toward the separating block 12 thereby streaking the black hard rubber compound with red hard rubber compound.

In the present instance and in the further operation of the machine the black hard rubber compound streaked with red hard rubber compound is forced into the passageways 13 of the separating block 12 which acts to separate the incompletely mixed and streaked compound into a plurality of parts. The incompletely mixed or streaked compound is then forced along the passageways 13 to the openings 14 in the guide block 15 and through the passageways 17 of the feed block 16 into the contracted orifice 19 of the discharge block 18 to form the finished article.

The black hard rubber compound streaked with red hard rubber compound forms straight lines of various lengths and of contrasting colors, giving a grained appearance to the finished article which extends all the way through the same, the beauty of the article being enhanced by cutting, to further expose the grained effect.

From the above description it will be obvious that the machine may be varied by providing a greater or less number of passageways through which the material is forced to the contracted orifice 19, the number of parts into which the material is divided varying the grain of the finished article.

From the above it will be seen that means are provided for incompletely mixing or streaking plastic compounds of different colors one with the other, and dividing said plastic compounds into separate passageways through which they are forced to a contracted orifice to produce the finished article with a grained appearance.

While the invention has been described with particular reference to the details of construction, the same is not to be considered as limited thereto, as many changes can be made and still fall within the scope of the invention set forth in the following claims.

What I claim is:

1. A machine for graining plastic compounds which comprises a feed screw for incompletely mixing or streaking a plurality of plastic compounds of different colors, a plurality of independent elongated passageways, said feed screw being adapted to force said plastic compounds through said passageways, and a discharge block having an orifice, said feed screw acting to force said plastic compounds from said passageways through said discharge block to produce a grained effect in said compound.

2. A machine for graining plastic compounds which comprises a relatively short feed screw for incompletely mixing or streaking a plurality of plastic compounds of different colors, a plurality of independent passageways, said feed screw being adapted to force said plastic compounds through said passageways, and a feed block having independent converging passageways terminating in an orifice, said feed screw also acting to force said plastic compounds from said passageways through said feed block to produce a grained effect in said compound.

3. A machine for graining plastic compounds which comprises a relatively short feed screw for incompletely mixing or streaking a plurality of plastic compounds of different colors, a plurality of relatively long independent passageways, said feed screw being adapted to force said plastic compounds through said passageways, a discharge block having an orifice, said feed screw also acting to force said plastic compounds from said passageways through said discharge block to produce a grained effect in said compound.

4. A machine for graining plastic compounds which comprises a relatively short feed screw for incompletely mixing or streaking a plurality of plastic compounds of different colors, a separating block having a plurality of relatively long independent passageways, said feed screw being adapted to force said plastic compounds through said passageways, and a discharge block having an orifice, said feed screw also acting to force said plastic compounds from said passageways through said discharge block to produce a grained effect in said compound.

In testimony whereof I have signed this specification in the presence of two subscribing witnesses.

ALFRED C. BUTTFIELD.

Witnesses:
D. E. JONES,
K. J. DURANT.